No. 612,986. Patented Oct. 25, 1898.
W. J. BUSSE.
BALL BEARING FOR VEHICLE HUBS.
(Application filed Mar. 26, 1896.)
(No Model.)
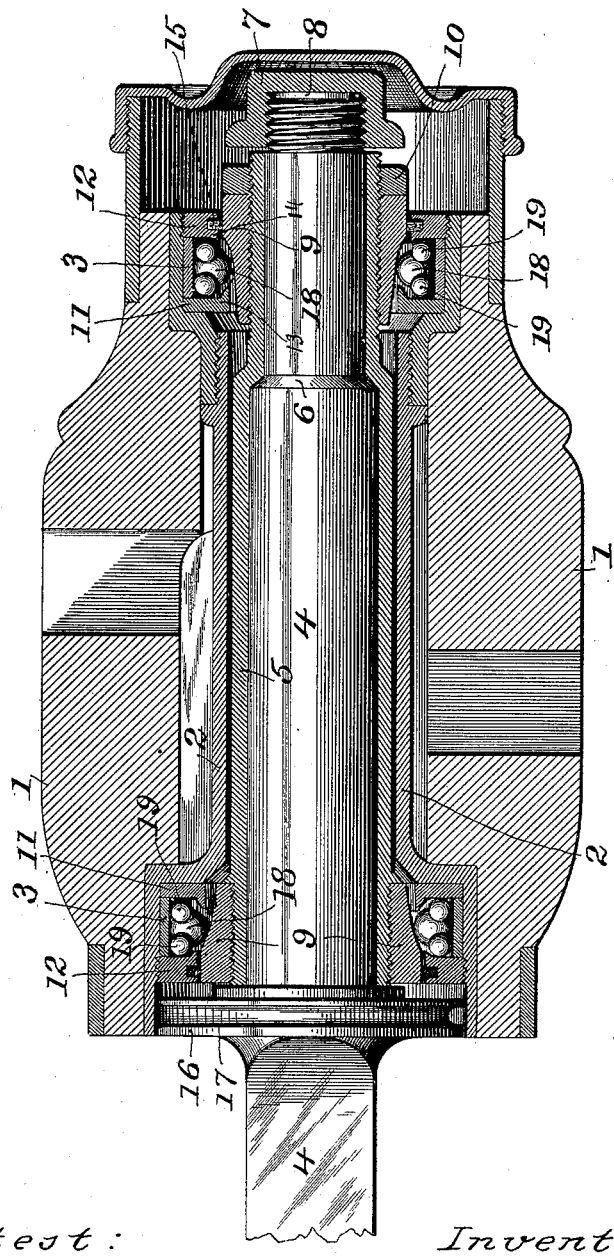
Attest:
Wm H Scott
Henry A. Nott
Inventor:
Wm. J. Busse,
by Robert Burns Att'y.

UNITED STATES PATENT OFFICE.

WILLIAM J. BUSSE, OF CHICAGO, ILLINOIS.

BALL-BEARING FOR VEHICLE-HUBS.

SPECIFICATION forming part of Letters Patent No. 612,986, dated October 25, 1898.

Application filed March 26, 1896. Serial No. 585,012. (No model.)

*To all whom it may concern:*

Be it known that I, WILLIAM J. BUSSE, a citizen of the United States, residing at Chicago, in the county of Cook and State of Illinois, have invented a certain Improvement in Ball-Bearings for Vehicle-Hubs; and I do hereby declare the following to be a full, clear, and exact description of the same, reference being had to the accompanying drawing, forming a part of this specification.

The present invention relates more especially to that type of ball-bearings for hubs and axles that forms the subject-matter of my prior Letters Patent, No. 567,732, dated September 15, 1896, for ball-bearings for cycles; and the present improvement has for its object to provide an improved construction and arrangement of the same whereby it is adapted for use in vehicle-hubs and in which the balls are held to place when the wheel-hub is detached from the axle, as will hereinafter more fully appear and be more particularly pointed out in the claims, a further object of the present improvement being to provide an improved construction of parts whereby a change can be readily effected so as to admit of the hub running upon the axle in a direct manner and leaving the ball-bearings dormant in case of an accident to the same, as will hereinafter more fully appear.

I attain such objects by the construction and arrangement of parts illustrated in the accompanying drawing, in which is shown a view in longitudinal sectional elevation of a vehicle hub and axle embodying the present invention.

Referring to the drawing, 1 represents the main or body portion of the hub, having a lining or shell 2, of metal, that is formed at each end with the usual enlarged cavities, in which is arranged the annular lining or bearing-sleeve 3, of steel or other like hard metal, and which constitutes an internal circular track for the travel of the bearing-balls.

The lining or shell 2 for the purpose of ready and convenient insertion into the bore of the hub-body will be made in sections that screw together, as shown.

4 is the axle proper, and 5 a covering-sleeve therefor that fits upon the same and is prevented from moving inwardly on the axle 4 by the stop-shoulder 6, and which sleeve 5 is normally held in place against any outward movement by the cap-nut 7, screwing onto the end of the axle, and which nut 7 in the normal condition of the bearings will be screwed up tightly against the end of the sleeve 5, so as to secure the same rigidly upon the axle and prevent any turning movement of such sleeve upon the axle. When, however, the ball-bearings become obstructed so as to prevent proper operation, the cap-nut 7 will be partly unscrewed, so as to release the sleeve 5 from its rigid engagement with the axle and leave it free to rotate upon the same, and in order that the revolution of the parts will not cause the cap-nut to turn so as to bind against the end of the sleeve 5 a thin disk or washer 8 will be introduced into said cap-nut to limit the inward adjustment of said nut and prevent the binding of the same against the sleeve 5. As so arranged the sleeve 5 will be free to rotate upon the axle 4 in manner usual to ordinary axle-bearings.

9 are the adjustable cones of the ball-bearings, screwing upon the screw-threaded periphery of the sleeve 5, as shown, and one of which, usually the outer one, will be made more easily adjustable than the other, so that proper adjustment of the ball-bearings may be wholly effected by the adjustment of such cone, which will be secured to its adjustment by the usual lock-nut 10.

11 are counterpart end bearing-rings, of steel or other like hard metal, fitting the inner ends of the respective ball-cavities of the lining-shell 2. 12 are similar bearing-rings fitting the outer ends of such cavities and secured in place by being screwed therein, as shown.

13 and 14 are inturned lips on the rings 11 and 12, that are of an annular form and are adapted to prevent the balls from dropping out of the ball-cavity of the hub when the axle and sleeve of the present invention are removed.

15 are annular rings, of felt or other like material, fitted within annular receiving-grooves therefor in the inner surfaces of the rings 12 and adapted to bear on the periphery of the cone 9 to prevent the entrance of dust into the ball-cavity.

16 is the usual collar on the axle, that fits the end of the shell or lining of the hub and which will usually be provided with an annular groove 17 in its periphery to prevent the passage of water toward the bearing.

18 are a series of main bearing-balls, and 19 the series of intermediate or auxiliary balls, arranged and operating in a manner similar to my former invention, as set forth in my prior patent, No. 567,732, of September 15, 1896.

Having thus fully described my said invention, what I claim as new, and desire to secure by Letters Patent, is—

1. A ball-bearing for vehicle-hubs, comprising in combination, a hub having enlarged cavities for the series of balls, an axle, ball-bearing cones, bearing-rings 11, provided with inturned annular lips 13, bearing-rings 12, main series of balls 18, and auxiliary series of balls 19, arranged in the ball-cavities, substantially as set forth.

2. A ball-bearing for vehicle-hubs, comprising in combination, a hub having enlarged cavities for the series of balls, an axle, ball-bearing cones, bearing-rings 11 and 12, provided with the inturned lips 13 and 14 respectively, main series of balls 18, and auxiliary series of balls 19, arranged in the ball-cavities, substantially as set forth.

3. A ball-bearing for vehicle-hubs, comprising in combination, a hub having enlarged cavities for the series of balls, an axle, ball-bearing cones, bearing-rings 11 and 12, the rings 12, being formed with receiving-grooves in their inner surfaces, felt rings 15 arranged in said grooves, main series of balls 18, and auxiliary series of balls 19, arranged in the ball-cavities, substantially as set forth.

In testimony whereof witness my hand this 16th day of March, 1896.

WILLIAM J. BUSSE.

In presence of—
ROBERT BURNS,
H. A. NOTT.